United States Patent
Sziljer et al.

(10) Patent No.: US 9,027,839 B2
(45) Date of Patent: May 12, 2015

(54) SECURITY ELEMENTS FOR ANTENNAS

(75) Inventors: Franz Sziljer, Fürstenfeldbruck (DE); Albert Ojster, Grünwald (DE); Ando Welling, Isen (DE); Peter Huber, Füstenfeldbruck (DE); Thomas Tarantino, Laufen (DE)

(73) Assignee: Giesecke & Devrient GmbH, Munich (DE)

( * ) Notice: Subject to any disclaimer, the term of this patent is extended or adjusted under 35 U.S.C. 154(b) by 593 days.

(21) Appl. No.: 12/376,191

(22) PCT Filed: Aug. 1, 2007

(86) PCT No.: PCT/EP2007/006818
§ 371 (c)(1),
(2), (4) Date: Apr. 23, 2009

(87) PCT Pub. No.: WO2008/014993
PCT Pub. Date: Feb. 7, 2008

(65) Prior Publication Data
US 2009/0308935 A1      Dec. 17, 2009

(30) Foreign Application Priority Data
Aug. 3, 2006   (DE) .................. 10 2006 036 286

(51) Int. Cl.
*G06K 5/00*       (2006.01)
*G06K 19/06*    (2006.01)
(Continued)

(52) U.S. Cl.
CPC ......... *G07D 7/0093* (2013.01); *Y10T 29/49018* (2015.01); *B42D 2033/04* (2013.01);
(Continued)

(58) Field of Classification Search
CPC ... G06Q 20/327; G06Q 20/00; G06K 19/077; G06K 19/0723; G06K 7/0008; G06K 19/07703; G06K 19/073; B41M 5/267; B41M 5/327; B41M 5/3375; B41M 3/142; B41M 5/30; B42D 25/00; B42D 2033/30; B42D 2033/20; B42D 25/29; B42D 25/41; B42D 2033/04; Y10S 430/146; Y10S 283/904
USPC ............ 235/492, 380, 493, 487; 345/204, 59; 340/10.41, 572.1; 194/207
See application file for complete search history.

(56) References Cited

U.S. PATENT DOCUMENTS 4,935,665 A * 6/1990 Murata ..................... 313/500
5,757,521 A    5/1998 Walters et al.
(Continued)

FOREIGN PATENT DOCUMENTS

DE    19630648    2/1998
DE    19963300    3/2001
(Continued)

OTHER PUBLICATIONS http://www.newton.dep.anl.gov/askasci/phy00/phy00740.htm, "Color and Temperature", all pages.*
(Continued)

*Primary Examiner* — Thien T Mai
(74) *Attorney, Agent, or Firm* — Workman Nydegger

(57) ABSTRACT

A portable data carrier (2) and a method for its production, including an apparatus (4) for storing and processing data, an antenna (6) for transmitting energy and information which is connected to the apparatus (4), as well as a plastic surrounding the apparatus (4) and the antenna (6), where the plastic of the portable data carrier is transparent or partially transparent and the antenna (6) has at least one security feature.

44 Claims, 1 Drawing Sheet

(51) Int. Cl.
*G07D 7/00* (2006.01)
*G06K 19/073* (2006.01)
*G06K 19/077* (2006.01)
*G11B 23/40* (2006.01)
*B42D 25/00* (2014.01)

(52) U.S. Cl.
CPC ......... *B42D2033/20* (2013.01); *B42D 2033/46* (2013.01); *G06K 19/07372* (2013.01); *G06K 19/07749* (2013.01); *G11B 23/40* (2013.01); *B42D 25/00* (2014.10)

(56) References Cited

U.S. PATENT DOCUMENTS

| | | | |
|---|---|---|---|
| 6,830,192 | B1 | 12/2004 | Krul et al. |
| 6,848,618 | B1 | 2/2005 | Krul |
| 7,040,663 | B1* | 5/2006 | Plaschka et al. ............. 235/493 |
| 2001/0054934 | A1* | 12/2001 | Antognetti et al. ........... 330/296 |
| 2002/0140557 | A1* | 10/2002 | Dukler et al. ............. 340/572.1 |
| 2002/0160786 | A1 | 10/2002 | Rietzler et al. |
| 2002/0167500 | A1* | 11/2002 | Gelbman ..................... 345/204 |
| 2003/0117336 | A1* | 6/2003 | Droz ............................. 343/866 |
| 2004/0118930 | A1* | 6/2004 | Berardi et al. ................ 235/492 |
| 2005/0150740 | A1* | 7/2005 | Finkenzeller et al. ........ 194/207 |
| 2007/0059901 | A1* | 3/2007 | Majumdar et al. ............ 438/455 |
| 2007/0090926 | A1* | 4/2007 | Potyrailo et al. ........... 340/10.41 |
| 2007/0257797 | A1* | 11/2007 | Rancien et al. ............ 340/572.1 |
| 2007/0299773 | A1* | 12/2007 | Soderstrom ..................... 705/39 |
| 2008/0135629 | A1* | 6/2008 | Douglas ........................ 235/492 |
| 2008/0191028 | A1* | 8/2008 | Kagaya et al. ................ 235/492 |
| 2011/0025505 | A1 | 2/2011 | Rancien et al. |

FOREIGN PATENT DOCUMENTS

| | | |
|---|---|---|
| DE | 20100158 U1 | 5/2002 |
| DE | 20320940 U1 | 9/2005 |
| EP | 0905657 | 3/1999 |
| EP | 1179811 | 2/2002 |
| EP | 1456815 B1 | 6/2006 |
| JP | 2005321911 | 11/2005 |
| WO | 02095674 | 11/2002 |
| WO | 03102713 | 12/2003 |
| WO | 2005025887 A1 | 3/2005 |
| WO | 2005100021 A2 | 10/2005 |

OTHER PUBLICATIONS http://www.newton.dep.anl.gov/askasci/phy00/phy00740.htm, "Color and Temperature", Jan. 14, 2004, all pages.*

* cited by examiner

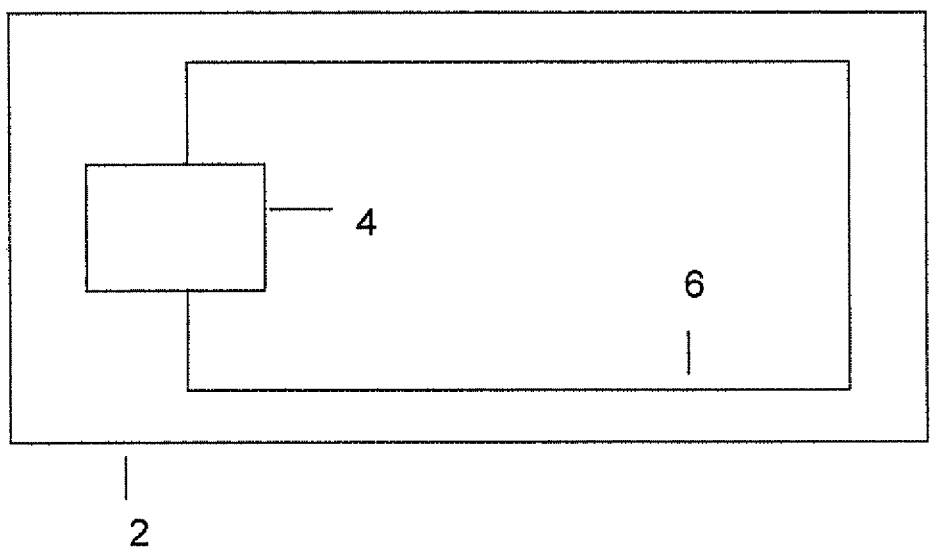

SECURITY ELEMENTS FOR ANTENNAS

BACKGROUND OF THE INVENTION

A. Field

The present invention relates to a portable data carrier, consisting of an apparatus for storing and processing data, an antenna for transmitting energy and information which is connected to the apparatus, as well as a plastic enclosing the apparatus and the antenna and a method for the production thereof.

B. Related Art

Portable data carriers, such as chip cards, are among other things used for determining authorizations or for identifying the owner. For this purpose frequently in addition to the inserted apparatus for storing and processing data security features on the data carrier are required in order to check the authenticity of the data carrier. Since an authenticity check is also carried out by persons and not only by machines, many security features, e.g. signature strips, guilloches, kinegrams, bar codes, etc. are based on optical features. It is a problem concerning these features that they can normally only be used in a sensible fashion in non-transparent data carriers.

It is therefore the object of the invention to provide suitable security elements for a transparent or partially transparent portable data carrier and a method for producing portable data carriers with such security elements.

BRIEF SUMMARY OF THE INVENTION

The essential element of the invention is that at least one security feature is applied on the surface of the antenna or on a coating of the antenna or is integrated in the antenna material or is mixed with the antenna material or that the antenna surface or the coating of the antenna is partially or completely printed or a structure is embossed in the complete or only parts of the antenna surface or the coating of the antenna.

Printing or embossing or coating the antenna surface or integrating security features in the antenna material or applying security features on the antenna surface has the advantage that the security features can be connected to the antenna by relatively simple and cost-effective means. Furthermore also a production of portable data carriers with a very small reject rate can be achieved.

The advantage of the invention is that in transparent or partially transparent portable data carriers the authenticity of the portable data carrier can be judged already on the basis of the inventive security features on the basis of the optical properties of the visible or partially visible antenna. Since the security features are disposed on and/or in the antenna and are enclosed by the plastic, they are very hard to forge, since for forging e.g. a chip card the card body and the antenna would have to be destroyed completely or manufactured newly. For this purpose the complete production process of a chip card would have to be set up and maintained, meaning a very great effort and consequently a high degree of security against falsification and misuse. In addition to the security aspect the security features can also be used as design elements.

As security features pigments or micro particles or color capsules, as described in detail in the following, or security threads or coatings, whose color changes in dependence on the temperature, or any other suitable security feature comes into question.

These security features have the advantage that these are already very proven features which are e.g. also already used successfully in bank notes or in security printing. The knowledge gained in the application fields, e.g. bank-note printing or security printing, can simply be transferred concerning the present security features.

Due to their proven properties in the mentioned areas, in the following the particularly suitable security features in the area of pigments and their properties will be described. These can be processed particularly easily and cost-effectively.

Pigments can be divided roughly into two classes. On the one hand, there are the pigments which can be detected without any technical aids and on the other hand those which can be detected only with technical aids.

Among the pigments detectable without any technical aids are e.g. color pigments or pigments with optical effects. Pigments with optical effects can be classified as pigments with color-shift effect, e.g. thin-film pigments, such as e.g. Iriodin®, or liquid crystal pigments or thermochromic pigments, e.g. liquid crystals, or pigments with glitter effect, e.g. small metal plates of e.g. aluminum or silver.

These pigments have the advantage that the authenticity of an inventive data carrier can be judged even with the naked eye. These pigments consequently substantially simplify and accelerate the authenticity check of a data carrier.

Among the pigments which are detectable only with technical aids are luminescent pigments, magnetic pigments, electrically conductive pigments or substances absorbing radiation in the infrared spectral range.

Luminescent pigments are selected in dependence on the security level to be achieved. In the case of a low security level, such as e.g. at supermarket cash desks, fluorescent substances are sufficient which are excited by electromagnetic radiation in the ultraviolet spectral range and emit light in the visible spectral range. In the case of a high security level, such as e.g. in central banks, luminescent pigments are used which upon excitation emit radiation in the invisible spectral range, and whose radiation can be measured only by means of special sensors. In principle luminescent pigments can be excited by electromagnetic radiation in the ultraviolet or infrared or visible spectral range or by an electrical or magnetic field.

The pigments detectable only with technical aids can therefore be used to complement the pigments detectable without technical aids, so to speak as an additional protection, or they can be used on their own for portable data carriers in particularly security-relevant areas. By way of example the vault area of major banks should be mentioned, in which only special persons may be present. Pigments that are detectable only with technical aids would render forging portable data carriers for such areas, e.g. chip cards, substantially more difficult.

In addition to the pigments also micro particles and/or color capsules are used advantageously as security feature. Also concerning these features a distinction can be made between those security features that can be detected without and those that can be detected only with technical aids.

Micro particles are small particles which have a certain shape, color, surface structure, inscription or images. One possible embodiment is that the micro particle represents the writing or the logo of a company. Thus e.g. a card would be authentic if the company logo is detectable on the micro particles.

Color capsules are capsules which are electrically insulated toward the outside and which change their color upon a change of the electrical field surrounding them. Such color capsules are also known under the name e-ink. These color capsules can be arranged on the antenna e.g. in certain patterns. For checking the authenticity upon a change of the electrical field surrounding the card e.g. a certain color pattern would appear on condition that the card is authentic.

The above-mentioned security features are detectable on the antenna from the outside through the transparent or partially transparent data carrier, wherein as antenna all suitable antenna types for portable data carriers can be used, such as e.g. printed antennas, wire antennas or etched antennas.

The advantage of the printed antennas, wire antennas or etched antennas is that these antenna types are already very proven antennas and can be produced comparatively cost-effectively.

In the case of printed antennas the above-mentioned security features can be used advantageously. These are simply mixed with a binding agent of an antenna printing paste during the production of the antenna, and can thus be processed very easily. Another possibility is that the above-mentioned security features are applied on the printed antenna.

As electrically conductive material of the antenna printing past for printed antennas all suitable substances can be used, such as e.g. silver or gold. Optical effects or colors of the electrically conductive materials can be used in a particularly advantageous fashion here.

A wire antenna consists of a wire that is coated with an insulating lacquer. By applying the above-mentioned security features or security threads with the insulating lacquer on the wire or on the insulating lacquer, a simple and cost-effective processing of the security features can be achieved. As an alternative to the above-mentioned security features or security threads as a further security feature a coating can be disposed on the wire instead of or in addition to the insulating lacquer, wherein the color of the coating changes in dependence on the temperature. This would have the advantage that for checking authenticity the optical check by means of electromagnetic radiation in a certain spectral range is complemented by an optical check by means of heat and consequently a greater security against falsification and misuse is achieved.

In order to achieve a better conductivity and workability, the wire can also consist of a suitable alloy.

One further possible embodiment of the antenna is that of an etched antenna. This can be produced in a very simple and reliable fashion by proven production methods, wherein very high quantities can be achieved within a small period of time at an inexpensive production price. In the case of the etched antenna the above-mentioned security features can be applied on the antenna.

As portable data carriers, in addition to chip cards, all portable data carriers suitable for the invention come into question, such as e.g. tag, key fob, contactless USB stick, mobile phones, etc., in which the antenna is integrated in the transparent or partially transparent housing.

The object of the invention is furthermore solved on the basis of the preamble of a method for producing a portable data carrier with an antenna described e.g. above that is printed, made of wire or is etched, a plastic body and an apparatus for storing and processing data, e.g. a semiconductor chip connected to the antenna, by the characterizing part of claim 36, in that at least one security feature is applied on or in the antenna or that the surface of the antenna is completely or partly printed or a structure is embossed in the complete or only parts of the antenna surface.

As described above the essential element of the invention is that at least one security feature is applied in the antenna and/or on the antenna surface and/or on a coating of the antenna and/or that the antenna surface or the coating of the antenna is completely or partly printed and/or a structure is embossed in the complete or only parts of the antenna surface or the coating of the antenna.

Concerning the advantages of printing or embossing or coating the antenna surface the above explanations are valid.

The advantage of the invention on the whole is that in transparent or partially transparent portable data carriers, such as e.g. chip cards, the authenticity of the portable data carrier can be judged already on the basis of the inventive security features on the basis of the optical properties of the visible or partially visible antenna. Since the security features are disposed in and/or on the antenna and are enclosed by plastic, they are very hard to forge, since for forging a portable data carrier would have to be destroyed completely or manufactured newly. For this purpose the complete production process for a portable data carrier, such as e.g. a chip card, would have to be set up and maintained, meaning a very great effort and consequently a high degree of security against falsification and misuse of inventive chip cards. In addition to the security aspect the security features can also be used as design elements.

Concerning the properties and advantages of the security features of pigment, micro particle, color capsule, security thread, coating, whose color changes in dependence on the temperature, reference is made to the above discussion.

As already explained above, in the production of printed antennas in the e.g. screen printing process, it is particularly advantageous to mix the pigments and/or micro particles and/or color capsules with a binding agent. This facilitates and simplifies the processing of the antenna printing paste with the added security features and thereby the production of inventive antennas and leads to a small reject rate, as already described above. In addition to adding, the mentioned security features can also be applied on the surface of the antenna.

Corresponding to the above discussion it is advantageous that in the production of an antenna made of wire at least one pigment and/or one micro particle and/or one color capsule and/or at least one security thread is applied on the wire with an insulating lacquer and/or the mentioned security features are applied on the insulating lacquer or that instead of or in addition to the insulating lacquer at least one coating is applied on the wire, which changes its color in dependence on the temperature. This would have the advantage that the used security features can be applied on the wire in a relatively simple fashion, thereby reducing the production costs.

In the production of an etched antenna the pigments can be vapor-deposited on the antenna e.g. with the help of a vapor-depositing method. This is a relatively simple and cost-effective method for applying the pigments on the antenna surface. Furthermore this allows achieving high production quantities at a comparatively low production cost and high quality. The other mentioned security features can then be arranged on the antenna surface.

DESCRIPTION OF THE DRAWING

A preferred embodiment of the invention is shown by way of example in FIG. 1.

DETAILED DESCRIPTION OF PREFERRED EMBODIMENTS OF THE INVENTION

The embodiment of a portable data carrier represented in FIG. 1 shows the structure in principle of a chip card 2 containing a semiconductor chip 4 that is connected to an antenna 6. The present invention solves the object of providing security elements for transparent or partially transparent contactless chip cards by adding security elements to the antenna 6. In principle the antenna 6 can be a printed antenna, a wire antenna or an antenna produced by a process consisting of the steps of coating, exposure and etching.

Independent of the structure of the antenna 6, a pigment or a surface structure is added to the antenna 6 as a security feature.

For the case of a printed antenna, this consists of a silver conductive paste applied on a plastic carrier in a screen-printing procedure. The silver conductive paste consists of its main components silver flakes which enable the electrical conductivity of the antenna 6 and a binding agent required for this purpose.

In order to enhance security or also to use the antenna as a design element, the following elements can be integrated into the binding element. In principle these elements are security pigments, such as known e.g. from bank-note printing. Concerning these pigments firstly a distinction must be made between such pigments which are detectable without aids and those which can are detectable only with aids. Pigments detectable without aids are color pigments, e.g. printing ink or pigments with optical effects. Concerning pigments with optical effects a distinction needs to be made between pigments with color-shift effect, thermochromic pigments and pigments with glitter effect. Pigments with a color-shift effect are e.g. thin-film pigments such as e.g. Iriodin® or liquid crystal pigments. Thermochromic pigments are e.g. liquid crystals. Pigments with glitter effect are e.g. little metal plates of e.g. aluminum or silver.

Pigments which are detectable only with aids are luminescent pigments, magnetic pigments, electrically conductive pigments or infrared absorbing substances. In the case of luminescent pigments the excitation takes place through electromagnetic radiation in different spectral ranges, wherein the emission can take place through electromagnetic radiation in different spectral ranges, e.g. excitation in the ultraviolet spectral range and emission in the visible spectral range. Substances for luminescent pigments are selected in dependence on the security to be achieved; in the case of a low security level, such as e.g. at cash desks in supermarkets, such substances are sufficient which are excited in the ultraviolet spectral range and emit electromagnetic radiation in the visible spectral range. In central banks e.g. such luminescent substances are used which emit an electromagnetic radiation in the invisible spectral range and can thus be measured only by means of special sensors. In principle excitation and emission are thus possible in different spectral ranges here. An excitation frequently takes place in the ultraviolet, infrared or visible spectral range. Alternatively also an excitation through an electrical field is possible. An emission is consequently possible in different or the same spectral ranges, as already described above.

As further security features also electrically animated pigments are suitable, which only start glowing once a field is applied to the antenna. These can then emit their light to a light-collecting film which radiates the light over the cutting edge of the card.

Furthermore as security features thermochromic pigments are possible, wherein the color of the pigments disposed on the antenna 6 changes upon a temperature change. This effect can be achieved by heat applied from the outside, or e.g. by self-heating of the antenna by placing the antenna 6 in the field of a contactless reader.

Another possibility for a security feature are micro particles, e.g. logo of the company in question, of e.g. metal or plastic or other materials. The micro particles can be disposed individually or in a chained fashion in the binding agent of the printed antenna 6.

Furthermore also combinations of the described possibilities are possible in double or multiple antenna printing.

Additionally the silver flakes can also be replaced by other electrically conductive materials, such as e.g. gold. In the case of visible antennas of transparent or partially transparent contactless cards these can also be used to show the status of the respective user e.g. gold for a senator card.

When the printed antenna is disposed on the carrier substrate it can still be treated in different ways.

The surface of the antenna can be printed completely or partly e.g. with a company logo. Alternatively a structure can be embossed on the complete or parts of the antenna surface by means of an embossing die. The embossing die can also be replaced by a laminating plate in which a structure is integrated. Furthermore through a suitable embossing method an optical feature similar to the MLI can be produced.

Apart from the printed antenna, there are also antennas with a wire. The used wire most frequently consists of copper which is covered by a reddish insulation lacquer. In order to change the optical appearance of the wire and to integrate security elements there are the following possibilities.

Different pigments as described above can be added to the insulating lacquer. When the wire is coated the pigments are applied together with the insulating lacquer.

The material of the wire could be changed e.g. by special alloys. Therein the authenticity of the card could be checked upon its use.

As an alternative to the pigments or in addition thereto security threads can be integrated in the lacquer application process, which security threads are visible after the production e.g. in the transparent card.

In addition to applying pigments or security threads the complete or parts of the surface of the wire can be embossed with a structure, e.g. a company logo, e.g. by pulling it through two or several rollers rotating in the contrary direction, or can be inscribed by a laser beam. Instead of the wire a structure can also be embossed on the lacquer or also a different layer on the wire.

As a further security feature the wire can also be covered by a coating changing its color in dependence on the temperature. This coating can be applied on the wire as an alternative or in addition to the above-mentioned insulating lacquer.

In addition to the printed antenna and the wire antenna there is also the possibility to produce an antenna by means of a method for applying, exposing and etching the coating. The antennas 6 produced by such a method are also referred to as etched antennas. These antennas consist e.g. of copper or aluminum. In order to change the security or the optical appearance of the antennas, the following methods can be used.

By a so-called vapor-depositing method or a different additive method different materials, e.g. the above-described pigments, can be applied subsequently on the surface of the antenna 6.

The antenna 6 can be printed completely or partially with e.g. a company logo, or a structure, e.g. of a company logo, can be embossed in the whole antenna surface or only parts thereof. For embossing a structure e.g. an embossing die or a laminating plate can be used, into which the structure to be embossed is integrated.

Furthermore through a suitable embossing method an optical feature similar to the MLI can be produced.

A micro script can either already be integrated in the etching mask for the antenna 6 and become visible on the antenna 6 after the etching process or it can be engraved subsequently, e.g. through laser engraving.

Independent of the issue of how the antenna 6 is now structured, also other electrical elements can be connected to the antenna 6, such as e.g. an LED or an LCD display (e.g. e-ink), which are activated by the antenna 6 when the antenna 6 is placed in an electromagnetic field of a contactless reader.

Classically the antenna 6 is disposed in the card 2 between differently laminated plastic layers. In order to economize costs, the contactless chip module 4 can be integrated in an injection-molded card in such a fashion that after the production of the injection-molded card the two antenna connections of the chip module 4 are open toward the surface and end flush with the card surface. Onto this an antenna 6 can be printed subsequently or a different suitable antenna can be applied e.g. in the single-card screen-printing method or the pad printing method, and thereby the chip module 4 can be connected to the antenna 6. Ideally the antenna 6 is coated with a lacquer in a further printing step and is mechanically protected by the lacquer layer. This lacquering process can be executed in such a way that the structure of the antenna 6 is plastically emphasized on the finished card 2 and is also well palpable. Instead of the printed antenna the antenna could e.g. also be applied through an embossing procedure from a metal foil (e.g. a hologram foil). This would also have the advantage that the security features applied on the antenna 6 are detectable in dependence on the type of security feature with or without aids.

A further advantageous embodiment of the present invention would be to have one antenna 6 according to the present invention and one module comprising the semiconductor chip 4 on one card each, wherein both cards need to be stuck together in order to enable the operation of the contactless chip card 2. The cards are then connected via the contact surfaces of the cards and are thus rendered operable as a whole. A suitable retainer of the two cards enables the assembly of the two cards in exact register. By means of a mechanical element, e.g. a slider, the contact between the two cards can be established, wherein due to the inventive antenna e.g. the authenticity of the card or of the card module of a transparent or partially transparent card can be detected with or without aids.

Consequently in the case of completely or partially transparent contactless chip cards the security and the protection against misuse of the card can be enhanced by adding security features to the antenna according to the present invention.

The invention claimed is:

1. A portable data carrier, comprising:
   data storing and processing apparatus;
   an antenna for transmitting energy and information, the antenna being connected to the apparatus; and
   a plastic surrounding the apparatus and the antenna;
   wherein the plastic of the portable data carrier is transparent or partially transparent and the antenna includes at least one security feature,
   wherein the entire antenna and the entire security feature are visible through the plastic,
   wherein the at least one security feature is disposed on either or both of an inner or outer surface of the antenna,
   wherein the security feature of the antenna comprises at least one of a pigment, a micro particle, a color capsule, or a coating,
   wherein at least a color of the at least one of pigment, micro particle, color capsule, or coating changes in dependence on a temperature of the security feature, wherein the at least one of pigment, micro particle, color capsule, or coating emits light in a first spectral range when the security feature has a first temperature and emits light in a second spectral range when the security feature has a second temperature.

2. The data carrier according to claim 1, wherein the antenna comprises a printed antenna.

3. The data carrier according to claim 2, wherein the printed antenna comprises antenna printing paste and a binding agent, wherein said binding agent comprises at least one of a pigment, one micro particle, or one color capsule, or wherein the outer surface of the antenna comprises at least one of one pigment, one micro particle, or one color capsule.

4. The data carrier according to claim 3, wherein an optical effect of the at least one security feature, due to the at least one of the pigment or the color capsule, is detectable without technical aids.

5. The data carrier according to claim 4, wherein the pigment comprises a color pigment.

6. The data carrier according to claim 4, wherein the pigment comprises a pigment with optical effects.

7. The data carrier according to claim 6, wherein the pigment comprises a pigment with color-shift effect.

8. The data carrier according to claim 7, wherein the pigment is a thin-film pigment or a liquid-crystal pigment.

9. The data carrier according to claim 6, wherein the pigment is a thermochromic pigment.

10. The data carrier according to claim 6, wherein the pigment is a pigment with glitter effect.

11. The data carrier according to claim 3, wherein at least one of the pigment, the micro particle, or the color capsule is detectable only with technical aids.

12. The data carrier according to claim 11, wherein the pigment is a luminescent pigment.

13. The data carrier according to claim 12, wherein the luminescent pigment is excited by electromagnetic radiation to emit electromagnetic radiation.

14. The data carrier according to claim 13, wherein the luminescent pigment is excitable by electromagnetic radiation in the ultraviolet or infrared or visible spectral range to emit electromagnetic radiation in the ultraviolet or infrared or visible spectral range.

15. The data carrier according to claim 12, wherein the luminescent pigment is excitable by an electrical or magnetic field.

16. The data carrier according to claim 11, wherein the pigment comprises a magnetic pigment.

17. The data carrier according to claim 11, wherein the pigment comprises an electrically conductive pigment.

18. The data carrier according to claim 11, wherein the pigment comprises a substance which absorbs radiation in the infrared spectral range.

19. The data carrier according to claim 4, wherein the micro particles have at least one of different shapes, colors, surface structures, inscriptions, or images.

20. The data carrier according to claim 19, wherein the micro particles comprise at least one of metal, or plastic.

21. The data carrier according to claim 4, wherein the color capsules change their color in dependence on an applied electrical field.

22. The data carrier according to claim 3, wherein the antenna printing paste comprises electrically conductive materials.

23. The data carrier according to claim 22, wherein the antenna printing paste comprises silver or gold as the electrically conductive material.

24. The data carrier according to claim 3, wherein a surface of the antenna is either or both completely or partially embossed with a structure or completely or partially printed.

25. The data carrier according to claim 1, wherein the antenna comprises a wire antenna.

26. The data carrier according to claim 25, wherein wire of the wire antenna is coated with an insulating lacquer.

27. The data carrier according to claim 26, wherein at least one of a pigment, color capsule, or several micro particles is disposed between the wire of the wire antenna and the insulating lacquer, wherein the at least one of the pigment, a substance having several micro particles, or color capsule is detectable without technical aid.

28. The data carrier according to claim 26, wherein between the wire of the wire antenna and the insulating lacquer, there is disposed at least one security thread.

29. The data carrier according to claim 26, wherein above the wire of the wire antenna, instead of or in addition to the insulating lacquer, there is disposed a coating which varies its color in dependence on the temperature.

30. The data carrier according to claim 26, wherein, in the complete or in parts of the surface of the wire of the wire antenna, or at least in an insulating lacquer or the coating of the wire, a structure is completely or partially embossed, or complete or parts of a surface of the wire or at least the insulating lacquer or a coating of the wire is completely or partially printed.

31. The data carrier according to claim 26, wherein the wire of the wire antenna comprises an alloy.

32. The data carrier according to claim 1, wherein the antenna comprises an etched antenna.

33. The data carrier according to claim 32, wherein on either or both of the inner or outer surface of the etched antenna at least one of pigment, several micro particles, or color capsule detectable without technical aids is disposed or a structure is embossed in the complete or in parts of a surface of the antenna or a surface of the antenna is completely or partially printed.

34. The data carrier according to claim 1, wherein the data carrier is a chip card.

35. A method for producing a contactless data carrier having:
an antenna that is printed or produced of wire or etched, an apparatus for storing and processing data which is connected to the antenna, and a plastic body enclosing the apparatus and the antenna, wherein the plastic body is transparent or partially transparent, and
wherein the entire antenna and the entire security feature are visible through the plastic body,
the method comprising the step of:
either or both of applying at least one security feature on a surface of the antenna, or mixing the at least one security feature with a material of the antenna, including using as the security feature at least one of a pigment, a micro particle, a color capsule, or a coating,
wherein a color of the pigment, micro particle, color capsule, or coating changes in dependence on a temperature of the security feature, wherein the at least one of pigment, micro particle, color capsule, or coating emits light in a first spectral range when the security feature has a first temperature and emits light in a second spectral range when the security feature has a second temperature.

36. The method according to claim 35, including printing the antenna by screen printing from a mixture comprising a conductive paste and a binding agent, wherein at least one pigment, micro particle, or color capsule is added to the binding agent.

37. The method according to claim 35, including forming the antenna of wire, wherein at least one pigment, one micro particle, color capsule, or at least one security thread is applied with at least one of the following: an insulating lacquer on the wire, or at least one coating applied on the wire that changes color in dependence on the temperature.

38. The method according to claim 35, including forming the antenna by etching, comprising producing on thermoplastic material an antenna by coating, exposure and etching steps, wherein pigments are vapor-deposited on the antenna using a vapor-depositing method and subsequently applying either or both of micro particles or color capsules.

39. The method according to claim 35, wherein the data carrier is a chip card.

40. The data carrier according to claim 1, wherein a change of the colour can be is achieved by self-heating of the antenna by placing the antenna in a field of a contactless reader.

41. The method according to claim 35, wherein a change of the colour is achieved by self-heating of the antenna by placing the antenna in a field of a contactless reader.

42. The data carrier according to claim 1, wherein the color of the at least one pigment, microparticle, colour capsule or coating reversibly changes colour in dependence on the temperature of the security feature.

43. A portable data carrier comprising:
at least a first card comprising a data storing and processing apparatus; and
at least a second card comprising an antenna for transmitting energy and information, said antenna comprising at least one security feature, and at least said second card being surrounded by plastic,
wherein the plastic of the at least second card is transparent or partially transparent,
wherein the entire antenna and the entire security feature are visible through the plastic,
wherein the at least one security feature is disposed on either or both of an inner or outer surface of the antenna,
wherein the security feature of the antenna comprises at least one of a pigment, a micro particle, a color capsule, or a coating, wherein at least a color of the at least one of pigment, micro particle, color capsule, or coating changes in dependence on a temperature of the security feature, and
wherein the first and second cards are configured in a way such that the first and second cards must be coupled together in order for the portable data carrier to operate, wherein the at least one of pigment, micro particle, color capsule, or coating emits light in a first spectral range when the security feature has a first temperature and emits light in a second spectral range when the security feature has a second temperature.

44. The portable data carrier according to claim 43, further comprising a mechanical element configured to establish contact between the first and second card.

* * * * *